US 6,554,575 B2

(12) United States Patent
Leeke et al.

(10) Patent No.: US 6,554,575 B2
(45) Date of Patent: Apr. 29, 2003

(54) RAMPED TIP SHELF BLADE

(75) Inventors: Leslie Eugene Leeke, Burlington, KY (US); Sean Robert Keith, Fairfield, OH (US); Ronald Eugene Mc Rae, Jr., Wyoming, OH (US); Dean Thomas Lenahan, Cincinnati, OH (US); David Alan Frey, West Chester, OH (US); Daniel John Harris, West Chester, OH (US)

(73) Assignee: General Electric Company, Schenectady, NY (US)

( * ) Notice: Subject to any disclaimer, the term of this patent is extended or adjusted under 35 U.S.C. 154(b) by 17 days.

(21) Appl. No.: 09/965,349

(22) Filed: Sep. 27, 2001

(65) Prior Publication Data
US 2003/0059304 A1 Mar. 27, 2003

(51) Int. Cl.[7] ................................................ F01D 5/18
(52) U.S. Cl. ...................................... 416/224; 416/97 R
(58) Field of Search ................................ 416/97 R, 92, 416/224, 173.4, 96 R, 236 R; 415/115, 116

(56) References Cited

U.S. PATENT DOCUMENTS 5,261,789 A   11/1993   Butts et al.
6,422,821 B1 * 7/2002   Lee et al. .................... 416/224

OTHER PUBLICATIONS

GE Aircraft Engine, "Blade Tip," in commercial use in USA more than one year.

* cited by examiner

Primary Examiner—Edward K. Look
Assistant Examiner—Kimya N McCoy
(74) Attorney, Agent, or Firm—William Scott Andes; Francis L. Conte

(57) ABSTRACT

A gas turbine engine blade includes pressure and suction sides extending between leading and trailing edges and root to tip. The pressure side includes a tip rib recessed therein to define a tip shelf terminating in an inclined ramp. The ramp may be aligned with streamlines of combustion gas flow for preventing interruption thereof and the increase of heat transfer therefrom.

20 Claims, 2 Drawing Sheets

RAMPED TIP SHELF BLADE

BACKGROUND OF THE INVENTION

The present invention relates generally to gas turbine engines, and, more specifically, to turbine blade cooling therein.

In a gas turbine engine, air is pressurized in a compressor and mixed with fuel in a combustor for generating hot combustion gases which flow downstream through turbine stages that extract energy therefrom. A high pressure turbine powers the compressor, and a low pressure turbine powers an upstream fan in a turbofan aircraft engine embodiment.

The first stage turbine blades first receive the hot combustion gases from the combustor and are typically air cooled by using air bled from the compressor. Turbine blade cooling is quite esoteric and the art is well crowded in view of the complex nature of blade cooling.

A typical turbine blade includes a generally concave pressure side and an opposite, generally convex suction side extending axially or chordally between leading and trailing edges which extend radially in span from root to tip of the blade. The airfoil portion of the blade is hollow and extends radially outwardly from a supporting dovetail which mounts the blade in a supporting rotor disk.

Cooling air is channeled to each blade through the dovetail and various internal passages are formed inside the airfoil for tailoring cooling thereof to mitigate the various heat loads experienced around the outer surface of the airfoil.

The radially outer end or tip of the airfoil is particularly difficult to cool since it is exposed to hot combustion gases along both the pressure and suction sides of the airfoil as well as in the radial clearance or gap formed with the surrounding stator casing or shroud. Since turbine blades are subject to occasional tip rubs, the airfoil tip is typically formed by squealer rib extensions of the pressure and suction sides which join together at the leading and trailing edges and define an open tip plenum therebetween having a floor which encloses the internal passages of the airfoil.

A significant advancement in blade tip cooling is U.S. Pat. No. 5,261,789 which discloses the use of a tip shelf along the pressure side of the turbine blade. The tip shelf is fed with cooling air through holes formed therethrough and interrupts the flow of combustion gases along the pressure side of the blade tip. Improved cooling of the blade tip including the pressure side tip rib is obtained.

The typical profile of a turbine blade is a crescent in which the blade increases in width aft from the leading edge and then converges and decreases in width to the narrow trailing edge thereof. The desired aerodynamic performance of the blade controls the aerodynamic profile of the pressure and suction sides and typically results in relatively thin trailing edge regions of the blade.

Since the tip shelf described above is recessed into the pressure side of the turbine blade, the blade must have sufficient thickness near the trailing edge in which the shelf may be formed.

However, in turbine blades having relatively thin trailing edge regions, there is insufficient width in which the tip shelf may be formed while having sufficient strength for a long useful life of the blade. In such configurations, the tip shelf may be terminated forward of the trailing edge and introduced in the blade where space permits. Terminating the tip shelf in this manner will form a vertical face where the tip shelf blends with the pressure side, with the boundary of the tip shelf having horizontal and vertical lines intersecting at an aft corner.

Since the combustion gas flow can be tripped or interrupted by the aft shelf corner during operation, such tripping of the gas flow can increase the combustion gas heat transfer so that as the combustion gases reattach to the pressure side downstream of the terminated tip shelf, local heating of the tip can result in rapid oxidation of the blade tip which adversely affects the useful life of the blade.

Accordingly, it is desired to provide a turbine blade having improved tip cooling notwithstanding termination of the tip shelf upstream of the blade trailing edge.

BRIEF SUMMARY OF THE INVENTION

A gas turbine engine blade includes pressure and suction sides extending between leading and trailing edges and root to tip. The pressure side includes a tip rib recessed therein to define a tip shelf terminating in an inclined ramp. The ramp may be aligned with streamlines of combustion gas flow for preventing interruption thereof and the increase of heat transfer therefrom.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which:

FIG. 3 is an elevational sectional view through the airfoil illustrated in FIG. 1 and taken along line 3—3.

DETAILED DESCRIPTION OF THE INVENTION

Figure 1:
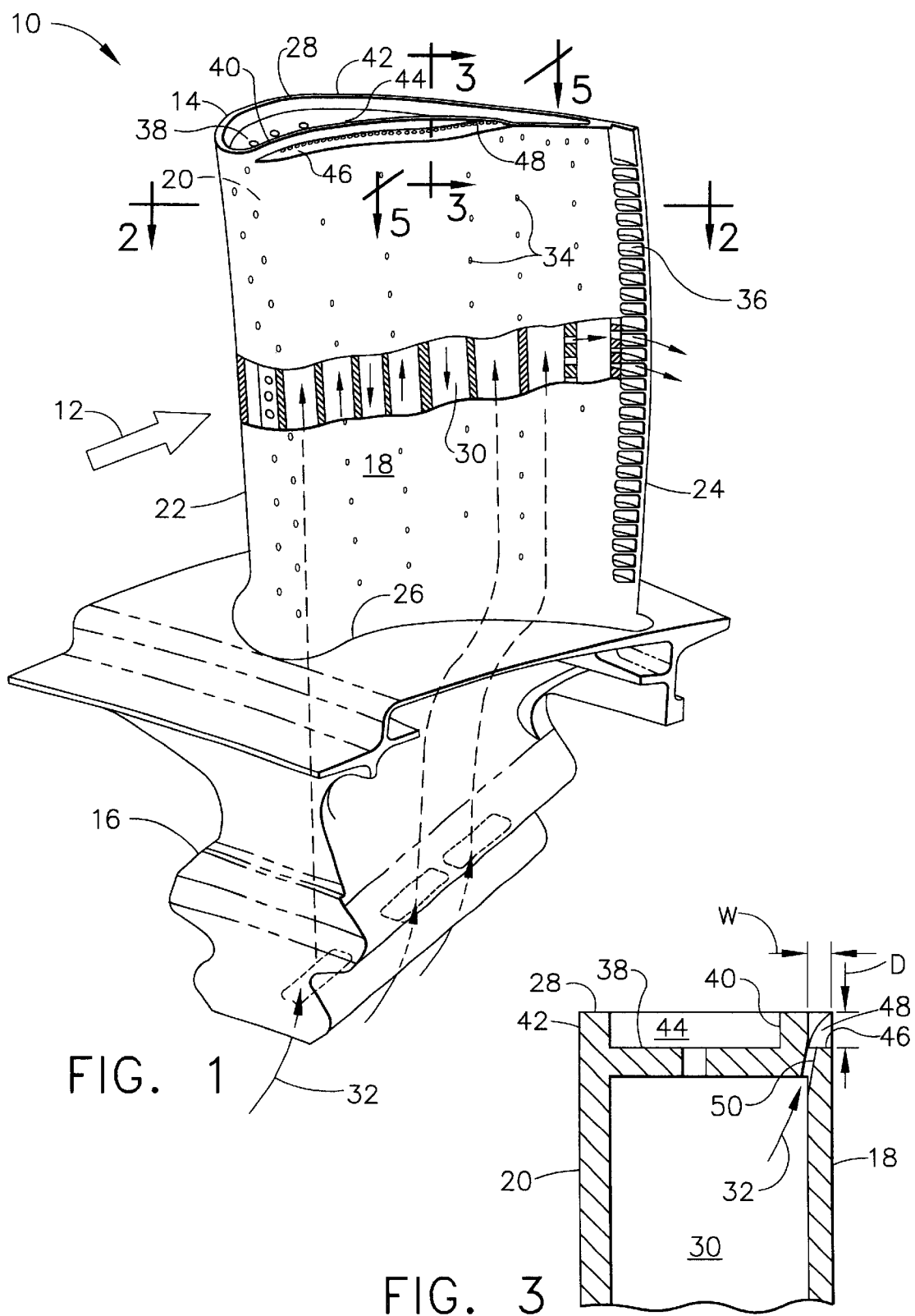
FIG. 1 is an isometric view of a gas turbine engine first stage rotor blade having blade tip cooling in accordance with an exemplary embodiment of the present invention.

Illustrated in FIG. 1 is an exemplary first stage turbine rotor blade 10 for a gas turbine engine over which is channeled hot combustion gases 12 during operation. The blade includes a hollow airfoil 14 integrally joined to a mounting dovetail 16 typically formed in a common casting. The airfoil is configured for extracting energy from the combustion gases. And, the dovetail is configured for securing the blade in the perimeter of a rotor disk (not shown) which is rotated during operation.

Figure 2:
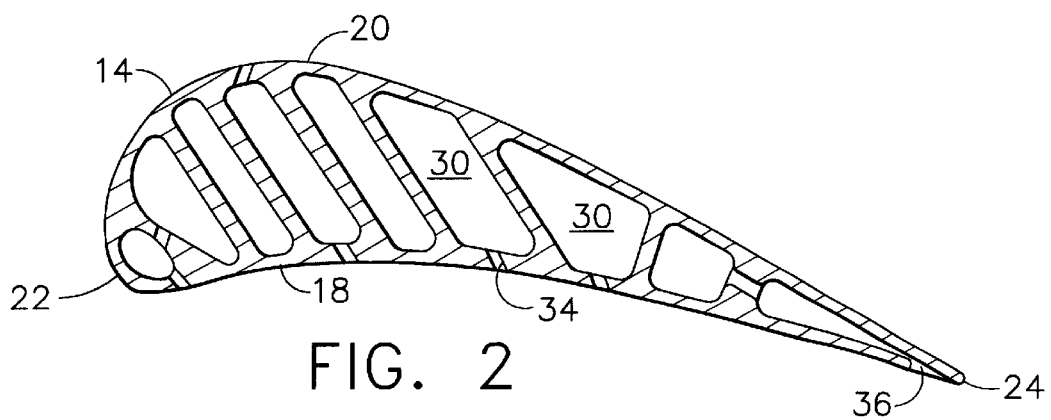
FIG. 2 is a radial sectional view through a portion of the blade airfoil illustrated in FIG. 1 and taken generally along line 2—2.

As shown in FIGS. 1 and 2, the airfoil has a crescent-shaped aerodynamic profile including opposite pressure and suction sides 18,20 which extend axially or chordally between opposite leading and trailing edges 22,24. The airfoil sides also extend radially in longitudinal span from a root 26 at an integral blade platform to a radially outer tip 28.

The hollow airfoil may have any conventional internal configuration and typically includes multiple internal flow passages 30 having suitable inlets in the dovetail 16 through which cooling air 32 is received from a compressor (not shown) of the engine for use as a coolant in cooling the blade during operation.

As shown in FIG. 2, there are nine internal flow passages 30 extending radially inside the airfoil for preferentially cooling the various portion thereof. The first two passages at the airfoil leading edge provide dedicated impingement cooling of the leading edge. The two passages in front of the trailing edge 24 provide dedicated cooling of the thin trailing edge region of the airfoil. And the five intermediate passages are arranged in a five-pass serpentine circuit for cooling the middle of the airfoil.

The airfoil includes various radial rows of film cooling holes 34 through the pressure and suction sides of the airfoil as required for providing effective cooling thereof. And, the airfoil includes a row of trailing edge discharge holes 36 for discharging the cooling air from the last two internal passages axially outwardly along the trailing edge. The trailing edge discharge holes 36 in the embodiment illustrated in FIGS. 1 and 2 are in the form of slots disposed in or breaching solely the pressure side 18 of the airfoil and terminate at the trailing edge itself. In this way, the trailing edge region of the airfoil may be relatively thin while introducing the discharge holes 36 through solely the pressure side thereof for maintaining sufficient strength of the airfoil for long life.

Figure 4:
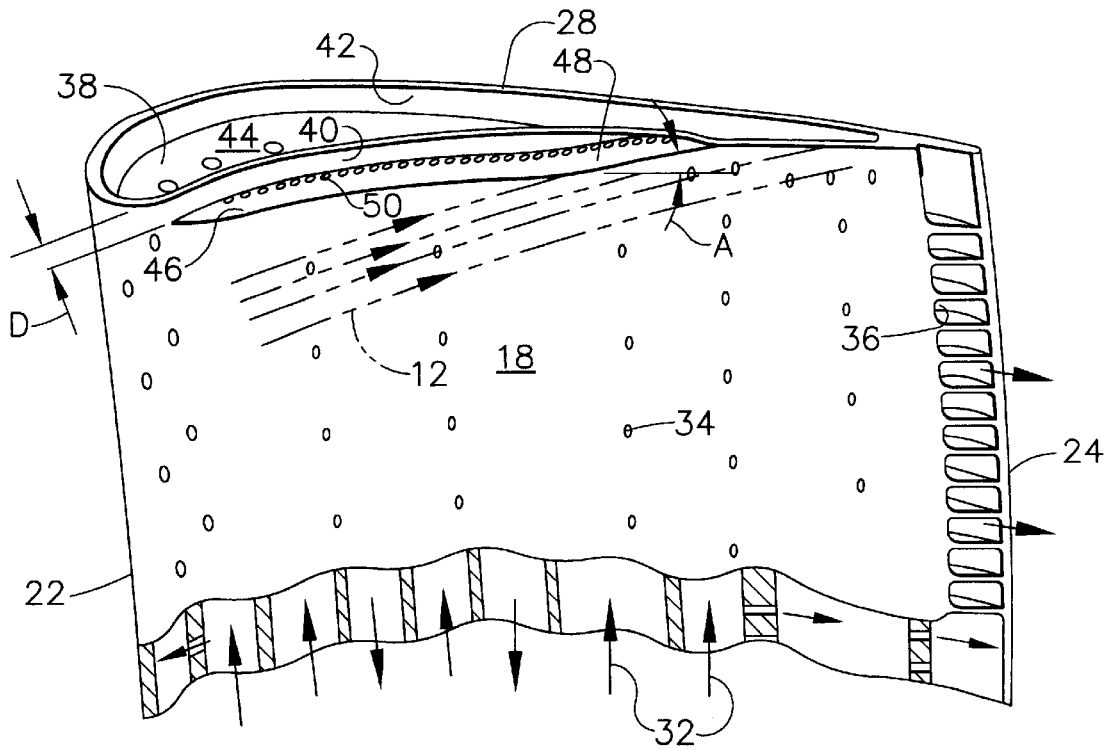
FIG. 4 is an enlarged, isometric view of the tip region of the airfoil illustrated in FIG. 1.

As shown in FIGS. 3 and 4, a generally flat tip floor 38 bridges the airfoil pressure and suction sides and encloses the several internal passages therein. The tip floor includes first and second squealer tip ribs 40,42 extending along the pressure and suction sides, respectively, and joining each other at the leading and trailing edges of the airfoil. The pressure and suction sides ribs 40,42 surround the blade tip and define an open tip plenum 44 therebetween.

The suction side second rib 42 forms an integral and coextensive extension of the airfoil suction sidewall from the leading edge to the trailing edge. The pressure side first rib 40 forms an extension of the airfoil pressure sidewall and is in minor part coextensive or flush therewith.

More specifically, the first rib 40 as illustrated in FIG. 4 is recessed into the pressure side of the airfoil from the airfoil tip 28 radially inwardly or downwardly to define an outward facing tip shelf 46 in the exemplary form of an L-shaped corner therein. As shown in FIGS. 3 and 4, the first rib 40 is recessed both in depth D downwardly from the airfoil tip and in width W inwardly from the pressure side to define the tip shelf therein.

In accordance with the present invention, the tip shelf 46 as illustrated in FIG. 4 terminates in an inclined ramp 48 which extends axially aft toward the trailing edge and radially upwardly toward the airfoil tip.

The two squealer ribs 40,42 illustrated in FIG. 4 have substantially identical heights above the tip floor for providing a substantially uniform radial clearance or gap with a surrounding stator casing (not shown). The tip shelf 46 preferably commences adjacent to the leading edge 22 of the airfoil and preferably slightly aft therefrom as required for enhancing tip cooling as the combustion gases 12 flow thereover during operation. The tip shelf extends in most part substantially parallel to the tip floor 38 and the ribs extending therefrom, with a substantially constant depth D up to its intersection with the shelf ramp 48. The ramp portion of the shelf then decreases in depth D to radially blend the ramp with the airfoil pressure side where it joins the airfoil tip.

As shown in FIG. 4, the first rib 40 is laterally coextensive or flush with the airfoil pressure side 18 both near the leading edge 22 and at its junction with the trailing edge 24. The ramp 48 is disposed forward from the trailing edge 24 where space permits due to the relatively thin lateral width of the trailing edge region of the airfoil. The first rib 40 therefore is coextensive with the pressure side 18 axially between the shelf ramp 48 and the trailing edge 24 for providing aerodynamic continuity of the pressure side surface.

Accordingly, the shelf ramp 48 terminates into the pressure side of the airfoil tip by blending therein both in depth D and width W and effectively disappears at the radially outermost portion or tip 28 of the airfoil forward of the trailing edge.

Figure 5:
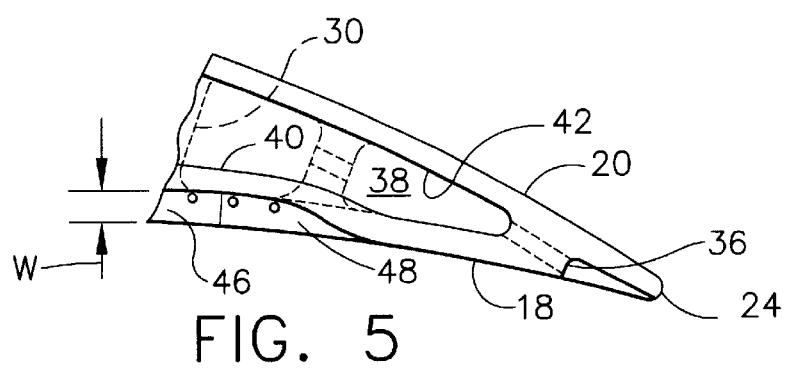
FIG. 5 is an enlarged top view of the trailing edge region of the airfoil tip illustrated in FIG. 1 and taken generally along line 5—5.

FIG. 5 illustrates an enlarged portion of the airfoil tip at the trailing edge including the aftmost portion of the tip shelf 46 and its terminating ramp 48. The airfoil trailing edge region is made as thin as possible in this exemplary embodiment, yet the walls forming the pressure and suction sides of the airfoil must have a minimum thickness for enhanced life. And, the size of the internal flow passages 30 have minimum dimensions based on the ability to form those passages using conventional casting.

In casting, long ceramic fingers are used to define the individual flow passages, some of which fingers are reinforced by slender rods buried therein. These rods extend to the tip plenum of the airfoil which is defined by a complementary ceramic block supported by the rods.

Accordingly, the tip shelf 46 illustrated in FIG. 5 is required to terminate forward of the airfoil trailing edge 24 since insufficient space exists for manufacture of both the shelf and suitably sized internal passages and tip plenum in the trailing edge region sized in width as thin as practical.

FIG. 4 illustrates that the forward end of the tip shelf 46 blends solely in the axial direction with the pressure side for maintaining the constant depth D thereof until it terminates at its forward end. A vertical face is therefore formed at the forward end of the tip shelf.

Similarly, the aft end of the tip shelf 46 could blend with the pressure side solely in the axial direction, but that would result in a similar vertical face at the aft end of the tip shelf. That vertical face would effectively form an L-shaped corner where the shelf terminates in the airfoil pressure side. Such a corner would be undesirable for the predominant direction of the combustion gas streamlines, representative ones of which are illustrated in FIG. 4, and which are inclined radially outwardly.

Modern three-dimensional computational flow analysis of the combustion gas flow predicts the inclination angle of the streamlines illustrated in FIG. 4. Such inclined streamlines when passing over the aft vertical face of the L-shaped tip shelf described above will cause local interruption in the streamlines with reattachment thereof just aft of the tip shelf. Interruption of the combustion gas streamlines increases the heat transfer thereof and may cause increased local heating of the airfoil tip just aft of the tip shelf.

However, in accordance with the present invention the tip shelf terminates in the inclined ramp 48 to eliminate the undesirable vertical face described above and the corresponding L-shaped corner of the tip shelf where it blends with the airfoil pressure side.

For the manufacturing reasons described above, the shelf ramp 48 illustrated in FIG. 4 preferably terminates forward of the trailing edge 24, and the pressure side 18 is coextensive along the tip shelf and ramp. The shelf ramp 48 is inclined at a small acute angle A relative to the substantially straight tip shelf 46 for substantially matching the angular orientation or inclination of the streamlines of the combustion gas flow at the desired design point in the operation of the engine.

The inclined shelf ramp 48 is therefore spaced forward from the airfoil trailing edge for providing uninterrupted continuity of the smooth airfoil pressure side 18 immediately aft of the tip shelf and ramp for maintaining attachment of the combustion gases 12 along the pressure side between the ramp and the trailing edge and over the aft portion of the pressure-side first tip rib 40. The combustion gas streamlines will flow generally parallel to the correspondingly inclined shelf ramp 48 to minimize or prevent flow separation of the combustion gas which would subsequently reattach along the pressure side. The combustion gases can remain attached to the pressure side as they flow immediately aft of the shelf ramp without adverse affect therefrom.

The tip shelf 46 illustrated in FIG. 4 is preferably substantially flat and has a substantially constant depth D from the airfoil tip. And, the shelf ramp 48 is preferably substantially flat or straight and adjoins the tip shelf at an obtuse included angle therebetween.

The shelf ramp is preferably sloped or inclined radially outwardly towards the airfoil tip and trailing edge at an inclination angle A of about 12 degrees from the nominal horizontal direction of the tip shelf, tip floor 38, and the first tip rib 40.

As shown in FIG. 3, the tip shelf 46 preferably adjoins the first rib 40 at a right-angled corner therebetween. And, a row of shelf discharge holes 50 extends inwardly through the tip floor 38 in flow communication with the internal flow passages 30 for discharging the coolant 32 therefrom. As shown in FIG. 4, the row of shelf holes 50 extends along the length of the tip shelf and ramp as desired for discharging the coolant therealong.

The coolant flow in the tip shelf provides film cooling of the pressure-side squealer rib 40 and a thermally insulating barrier against the heating effects of the hot combustion gases. The tip shelf enjoys all of the benefits of the original tip shelf disclosed in the above identified patent, and enjoys the additional benefits due to the introduction of the inclined shelf ramp 48 at the aft end of the shelf.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A gas turbine engine blade comprising:
    an airfoil having opposite pressure and suction sides extending in chord between leading and trailing edges and in span between a root and a tip;
    a tip floor bridging said pressure and suction sides, and including first and second ribs extending therealong to define a tip plenum therebetween; and
    said first rib is recessed into said pressure side to define a tip shelf therein, and said tip shelf terminates forward from said trailing edge in a ramp inclined outwardly toward said airfoil tip.

2. A blade according to claim 1 wherein said tip shelf commences adjacent said leading edge and extends in most part substantially parallel to said tip floor aft to said shelf ramp, and then decreases in depth therealong.

3. A blade according to claim 2 wherein said first rib is coextensive with said airfoil pressure side between said shelf ramp and said trailing edge, and said ramp blends both in depth and width with said pressure side at said tip.

4. A blade according to claim 3 wherein said airfoil further includes a row of trailing edge discharge holes breaching said pressure side and terminating at said trailing edge, and said shelf ramp is spaced forward therefrom for maintaining attachment of combustion gas flow along said pressure side therebetween.

5. A blade according to claim 4 wherein said shelf ramp is inclined in said pressure side for substantially matching streamlines of said combustion gas flow.

6. A blade according to claim 4 wherein said shelf ramp is inclined at about 12 degrees with said tip shelf.

7. A blade according to claim 4 wherein said shelf ramp is substantially flat.

8. A blade according to claim 4 wherein said tip shelf is substantially flat, and said shelf ramp is substantially flat and adjoins said tip shelf at an obtuse angle therebetween.

9. A blade according to claim 4 wherein said tip shelf adjoins said first rib at a corner therebetween, and includes a row of discharge holes therealong.

10. A gas turbine engine blade having a tip shelf recessed in a pressure side thereof along a squealer tip rib, and said shelf terminates in an inclined ramp forward of said trailing edge, and said ramp blends into said pressure side.

11. A blade according to claim 10 further including internal flow passages therein for channeling a coolant therethrough, and said tip shelf includes a row of discharge holes in flow communication with said passages for discharging said coolant along said shelf and ramp.

12. A blade according to claim 11 further comprising a suction side spaced from said pressure side and extending between said trailing edge and an opposite leading edge, and said tip shelf commences in said pressure side aft of said leading edge and has a substantially constant depth up to said ramp, with said ramp decreasing in depth to blend with said pressure side.

13. A blade according to claim 12 wherein said ramp further blends in width with said pressure side.

14. A blade according to claim 13 wherein said shelf ramp is inclined in said pressure side for substantially matching streamlines of combustion gas flow flowable along said pressure side.

15. A blade according to claim 13 wherein said shelf ramp is inclined at about 12 degrees with said tip shelf.

16. A gas turbine engine blade comprising a hollow airfoil and integral dovetail, with said airfoil having opposite pressure and suction sides extending between leading and trailing edges and from root to tip, and said tip includes first and second tip ribs extending along said pressure and suction sides, respectively, with said first tip rib being recessed both in depth and width in said pressure side to define a tip shelf therein terminating in an inclined ramp extending toward said trailing edge.

17. A blade according to claim 16 wherein said shelf ramp blends both in depth and width with said airfoil pressure side at said tip.

18. A blade according to claim 17 wherein said shelf ramp is inclined in said pressure side for substantially matching streamlines of combustion gas flow flowable along said pressure side.

19. A blade according to claim 18 wherein said shelf ramp terminates forward of said trailing edge, and said pressure side is coextensive along said tip shelf and ramp.

20. A blade according to claim 19 wherein said shelf ramp is inclined from said tip shelf at about 12 degrees.

* * * * *